(12) United States Patent
Menkhoff et al.

(10) Patent No.: US 10,491,247 B2
(45) Date of Patent: Nov. 26, 2019

(54) TRANSMITTER AND A METHOD FOR GENERATING AN ANALOG RADIO FREQUENCY TRANSMIT SIGNAL

(71) Applicant: INTEL IP CORPORATION, Santa Clara, CA (US)

(72) Inventors: Andreas Menkhoff, Oberhaching (DE); Thomas Bauernfeind, Arbing (DE); Dirk Friedrich, Munich (DE); Timo Gossmann, Neubiberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/321,082

(22) PCT Filed: Aug. 29, 2016

(86) PCT No.: PCT/IB2016/055145
§ 371 (c)(1),
(2) Date: Jan. 28, 2019

(87) PCT Pub. No.: WO2018/042219
PCT Pub. Date: Mar. 8, 2018

(65) Prior Publication Data
US 2019/0181889 A1    Jun. 13, 2019

(51) Int. Cl.
*H04B 1/00*         (2006.01)
*H04B 1/04*         (2006.01)
(52) U.S. Cl.
CPC ............. *H04B 1/0007* (2013.01); *H04B 1/04* (2013.01)

(58) Field of Classification Search
CPC .............................. H04B 1/0007; H04B 1/04
See application file for complete search history.

(56) References Cited

U.S. PATENT DOCUMENTS

| | | |
|---|---|---|
| 8,982,972 B2 | 5/2015 | Menkhoff |
| 2002/0193090 A1 | 12/2002 | Sugar et al. |
| 2007/0160158 A1 | 7/2007 | Zeng et al. |
| 2010/0052796 A1 | 3/2010 | Menkhoff |
| 2013/0287137 A1* | 10/2013 | Menkhoff ........... H04L 27/2601 375/295 |
| 2015/0147987 A1 | 5/2015 | Harris et al. |
| 2016/0182101 A1 | 6/2016 | Markovic et al. |
| 2017/0094606 A1 | 3/2017 | Menkhoff |

FOREIGN PATENT DOCUMENTS

| | | |
|---|---|---|
| DE | 102013113346.0 A1 | 2/2015 |
| DE | 102015110275.7 A1 | 12/2016 |
| JP | 2012531832 A | 12/2012 |

* cited by examiner

*Primary Examiner* — Nguyen T Vo
(74) *Attorney, Agent, or Firm* — 2SPL Patent Attorneys PartG mbB; Kieran O'Leary

(57) ABSTRACT

A transmitter for generating an analog radio frequency transmit signal is provided. The transmitter includes a digital-to-analog converter configured to receive an oscillation signal and a first digital data signal to generate an analog radio frequency transmit signal. Further, the transmitter includes an oscillation signal generator configured to generate the oscillation signal with an oscillation frequency based on a second digital data signal. The transmitter additionally includes a controller configured to change a first sample frequency of the first digital data signal from a first frequency to a value different than the oscillation frequency, wherein the first frequency is at least the oscillation frequency.

25 Claims, 9 Drawing Sheets

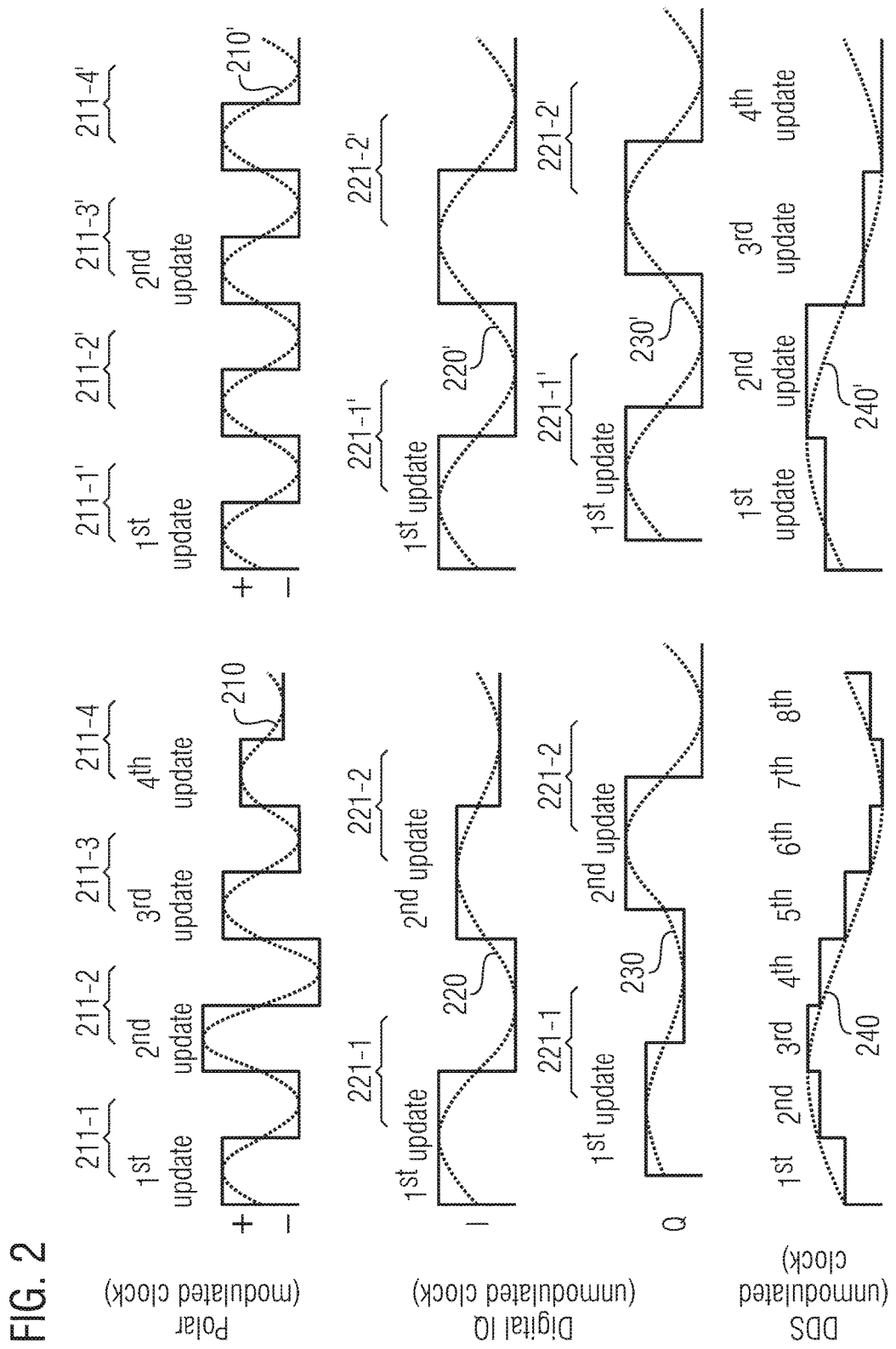

TRANSMITTER AND A METHOD FOR GENERATING AN ANALOG RADIO FREQUENCY TRANSMIT SIGNAL

FIELD

Examples relate to generating Radio Frequency (RF) transmit signals. In particular, examples relate to a transmitter and a method for generating an analog RF transmit signal.

BACKGROUND

For modern Radio Access Technologies (RATs), transceivers need to support standards with a huge variety of different bandwidths. For example, Narrow Band—Long Term Evolution (NB-LTE) for cellular Internet of Things (IoT) applications specifies a bandwidth of 180 kHz, wherein a further reduction of the bandwidth down to 15 kHz is discussed. On the other side, LTE20 specifies carrier aggregation with a bandwidth of 40 MHz, Wireless Local Area Networks (WLANs) use a bandwidth of 160 MHz, and 5th generation mobile networks (i.e. 5G) are specified for bandwidths of 100 MHz and more.

In principal, digital complexity of the transmitter and, hence, current consumption of the digital transmitter part increases with the bandwidth that is to be transmitted. For example, an LTE20 signal with 100 allocated Physical Resource Blocks (PRBs) requires an about 100 times higher complexity of the digital part/current consumption in the digital part of a transmitter compared to a transmitter optimized for one allocated PRB.

For each transmit band, different masks need to be fulfilled by the transmitter. Some of the masks are easier to fulfill than others. Moreover, the transmitter transmits its output signals with different output power.

Hence, there may be a desire for a transmitter architecture that allows for reduced current consumption.

BRIEF DESCRIPTION OF THE FIGURES

Some examples of apparatuses and/or methods will be described in the following by way of example only, and with reference to the accompanying figures, in which

FIG. 2 illustrates examples of the analog RF transmit signal for different first and second sample frequencies;

DETAILED DESCRIPTION

Figure 1:
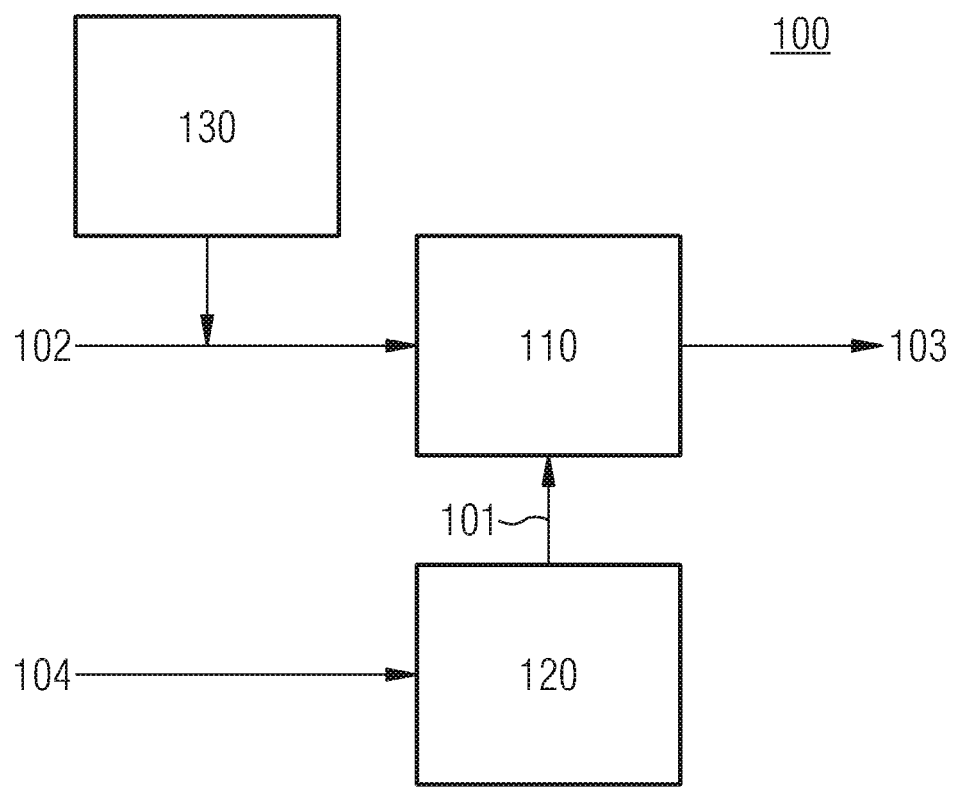
FIG. 1 illustrates an example of a transmitter for generating an analog RF transmit signal.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements.

The terminology used herein is for the purpose of describing particular examples and is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), LTE or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)—stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates a transmitter 100 for generating an analog RF transmit signal 103.

The transmitter 100 comprises a Digital-to-Analog Converter (DAC) 110 configured to receive an oscillation signal 101 and a first digital data signal 102. The DAC 110 is configured to generate the analog RF transmit signal 103 based on the oscillation signal 101 and the first digital data signal 102. For example, the DAC 110 may be a switched-capacitor DAC or a switched-current DAC. The first digital data signal 102 may be used to select a number of active DAC cells of the DAC 110, whereas the oscillation signal 101 may be used to select a switching frequency of the active DAC cells.

An oscillation signal generator 120 of the transmitter 100 is configured to generate the oscillation signal 101. The oscillation signal generator 120 generates the oscillation signal 101 with an oscillation frequency based on a second digital data signal 104. In other words, the oscillation signal generator 120 may change the oscillation frequency of the oscillation signal 101 based on the second digital data signal 104. Hence, the second digital data signal may be understood as a control signal for the oscillation signal generator 120.

The transmitter 100 may support different signal generation modes. Accordingly, for a Cartesian mode, the first digital data signal 102 may comprise an In-phase (I) component and a Quadrature (Q) component, whereas the second digital data signal 104 may comprise information on a channel frequency. For a polar mode, the first digital data signal 102 may comprise a Radius (R) component, whereas the second digital data signal 104 may comprise a phase component φ. For a Direct Digital Synthesis (DDS) mode, the first digital data signal 102 may comprise a Radius (R) component, whereas the second digital data signal 104 may comprise information on a reference frequency.

A controller 130 of the transmitter 100 is configured to change (adjust) a first sample frequency of the first digital data signal 102 from a first frequency to a value different than the oscillation frequency. For example, the controller 130 may control a processing element supplying the first digital data signal 102 to the DAC 110 to generate the first digital data signal 102 with the first sample frequency. In this respect, the first frequency is at least the oscillation frequency. The oscillation frequency may, e.g., be equal to the first frequency, so that the DAC 110 is updated in each RF cycle (i.e. a sample of the first digital data signal 102 is received by the DAC 110 for each oscillation period of the oscillation signal 101).

For example, the controller 130 may be configured to change (adjust) the first sample frequency of the first digital data signal 102 from the first frequency to a value lower than the oscillation frequency. Since the first sample frequency is adjusted to the value lower than the oscillation frequency, the DAC 110 is updated less frequent. In particular, the DAC 110 is no longer updated in each oscillation period of the oscillation signal 101. The current consumption of a digital block is proportional to the used data processing rate, i.e., the sample frequency of the input data signal. Accordingly, lowering the first sample frequency of the first digital signal 102 in order to lower an update rate of the DAC 110 may allow to lower a current consumption of the DAC 110. Moreover, also the current consumption of a processing element supplying the first digital data signal 102 to the DAC 110 may be reduced due to the lower first sample frequency of the first digital data signal 102.

In some examples, the controller 130 may further be configured to change a second sample frequency of the second digital data signal 104 from a second frequency to a value lower than the second frequency. That is, also the update rate of the control signal for the oscillation signal generator 120 may be reduced. Accordingly, lowering the second sample frequency of the second digital data signal 104 may allow to lower a current consumption of the oscillation signal generator 120. Moreover, also the current consumption of a processing element supplying the second digital data signal 104 to the oscillation signal generator 120 may be reduced due to the lower second sample frequency of the second digital data signal 104.

For example, reducing the first sample frequency by 50% to, e.g., half the oscillation frequency of the oscillation signal 101, and reducing the second sample frequency by 50% may allow to reduce the current consumption of the DAC 110, the oscillation signal generator 120 and the processing element supplying the first and the second digital data signals 102, 104 by approximately 50%. Similarly, reducing the first sample frequency by 75% may allow to reduce the current consumption of these elements by approximately 75%.

However, reducing the update rates for the DAC 110 and the oscillation signal generator 120 may lower the accuracy of the analog RF transmit signal 103. Hence, the controller 130 may in some examples be configured to change the first sample frequency based on a desired characteristic of an RF output signal which is derived from the analog RF transmit signal 103. The RF output signal may, e.g., be the output signal of a Power Amplifier (PA) amplifying the analog RF transmit signal 103, or the radiated signal of an antenna element which is fed based on the analog RF transmit signal 103. By considering the desired characteristic of the RF output signal, the controller may allow to lower the update rates for the DAC 110 and the oscillation signal generator 120 while complying with the requirements for signal transmission according to a mobile radio standard.

For example, the desired characteristic of the RF output signal may be one of a carrier frequency of the RF output signal, a signal power of the RF output signal, a bandwidth of the RF output signal, a number of resource blocks allocated to the RF output signal, a number of frequency carriers of the RF output signal, a duplex distance between the RF output signal and a RF receive signal, or a frequency and/or amplitude of an alias component in the RF output signal. Considering one or more of these parameters for changing the sample frequency may allow to find an optimum trade-off between required signal accuracy and minimum current consumption.

It is to be noted that a value of the desired characteristic of the RF output signal may depend on a characteristic of an external component processing the analog RF transmit signal 103 or a signal related to the analog RF transmit signal 103. For example, the value of the desired characteristic of the RF output signal may be influenced by characteristics of a specific antenna element used for radiating the RF output signal (as an example for a signal which is related to the analog RF transmit signal 103), or characteristics of any front-end element coupled between the DAC 110 and the antenna element (e.g. a PA, switches, duplexers, RF couplers etc.). The influence of the characteristic of the external component on the desired characteristic of the RF output signal may, e.g., be measured dynamically by the apparatus itself (e.g. during a self-calibration), or statically (e.g. by a factory calibration).

In some examples, the controller 130 may further be configured to change the second sample frequency of the second digital data signal 104 based on the desired characteristic of the RF output signal. Hence, also for the second digital data signal 104 an optimum trade-off between required signal accuracy and minimum current consumption may be found.

In some examples, the value lower than the second frequency is equal to the value lower than the oscillation frequency. That is, the sample frequencies of the first digital data signal 102 and the second digital data signal 104 may be changed to the same value below the oscillation frequency of the oscillation signal 101. Accordingly, the DAC 110 and the oscillation signal generator 120 are update with the same update rate (which is lower than the oscillation frequency of the oscillation signal 101). This configuration may, e.g., be used if the transmitter 100 is operated in polar mode.

Since for operating the transmitter 100 in Cartesian or DDS mode the channel frequency changes much seldom than for the polar mode, the update rate for the oscillation signal generator 120 may be lower than for the DAC 110. Accordingly, the value lower than the oscillation frequency may be greater than the value lower than the second frequency. So that the second sample frequency of the second digital data signal 104 is lower than the first sample frequency of the first digital data signal 102.

Generally speaking, some examples relate to a means for generating an analog RF transmit signal. The means comprises a means for receiving an oscillation signal and a first digital data signal to generate the analog RF transmit signal. Further, a means for generating the oscillation signal with an oscillation frequency based on a second digital data signal is comprised. Additionally, a means for changing a first sample frequency of the first digital data signal from a first frequency to a value different than the oscillation frequency is comprised. In this respect, the first frequency is at least the oscillation frequency.

In some examples, the means for changing the first sample frequency may be configured to change the first sample frequency from the first frequency to a value lower than the oscillation frequency.

In some examples, the means for changing the first sample frequency is configured to change the first sample frequency based on a desired characteristic of an RF output signal which is derived from the analog RF transmit signal.

The means for generating an analog RF transmit signal may be implemented by a transmitter for generating an analog radio frequency transmit signal described above or below (e.g. FIG. 1). The means for receiving an oscillation signal and a first digital data signal may be implemented by a DAC described above or below (e.g. FIG. 1). The means for generating the oscillation signal may be implemented by an oscillation signal generator described above or below (e.g. FIG. 1). The means for changing a first sample frequency of the first digital data signal may be implemented by a controller described above or below (e.g. FIG. 1).

In other words, one principle of the proposed concept is to vary the update rate of the DAC and/or the oscillation signal generator dynamically according to the needed accuracy.

FIG. 2 illustrates examples of the analog RF transmit signal for different first sample frequencies and different transmitter technologies.

In the upper row on the left side, the analog RF transmit signal 210 of a transmitter operated in polar mode is illustrated. For generating the analog RF transmit signal 210, the DAC and the oscillation signal generator are updated for each RF cycle, i.e., the first sample frequency of the first digital data signal and the second sample frequency of the second digital data signal are equal to the oscillation frequency of the oscillation signal supplied to the DAC. It is evident, that for each of the illustrated oscillation periods 211-1, 211-2, 211-3 and 211-4, the waveform of the analog RF transmit signal 210 is updated.

As a comparison, on the right side of the upper row, another analog RF transmit signal 210' of the transmitter is illustrated, wherein the DAC and the oscillation signal generator are updated for every second RF cycle. That is, the first sample frequency of the first digital data signal and the second sample frequency of the second digital data signal are half of the oscillation frequency of the oscillation signal supplied to the DAC. It is evident, that only for every second of the illustrated oscillation periods 211-1', 211-2', 211-3' and 211-4', the waveform of the analog RF transmit signal 210' is updated. That is, the number of updates is halved.

Similarly, in the middle row on the left side, the I and Q components 220 and 230 of the analog RF transmit signal of a transmitter operated in Cartesian mode are illustrated. For generating the I and Q components 220 and 230 of the analog RF transmit signal, the DAC portions for I and Q are updated for each RF cycle, i.e., the first sample frequency of the first digital data signal is equal to the oscillation frequency of the oscillation signal supplied to the DAC. It is evident, that for each of the illustrated oscillation periods 221-1 and 221-2, the waveforms of the I and Q components 220 and 230 of the analog RF transmit signal are updated.

As a comparison, on the right side of the middle row, the I and Q components 220' and 230' of another analog RF transmit signal of the transmitter is illustrated, wherein the DAC portions for I and Q are updated for every second RF cycle. That is, the first sample frequency of the first digital data signal is half of the oscillation frequency of the oscillation signal supplied to the DAC. Also the second sample frequency of the second digital data signal updating the oscillation signal generator is reduced. It is evident, that only for every second of the illustrated oscillation periods 221-1' and 221-2', the waveform of the I and Q components 220' and 230' of the analog RF transmit signal is updated. That is, the number of updates is halved.

In the lower row on the left side, the analog RF transmit signal 240 of a transmitter operated in DDS mode is illustrated. For generating the analog RF transmit signal 240, the DAC is updated multiple times for each RF cycle, i.e., the first sample frequency of the first digital data signal and the oscillation frequency of the oscillation signal supplied to the DAC are higher than the channel frequency of the analog RF transmit signal 240. It is evident, that for each RF cycle, the waveform of the analog RF transmit signal 240 is updated eight times (wherein the eight updates are merely for illustrative purposes, in general the DAC may be updated with any number of samples per RF cycle).

As a comparison, on the right side of the lower row, another analog RF transmit signal 240' of the transmitter is illustrated, wherein the DAC is updated only four times per RF cycle. That is, the first sample frequency and the oscillation frequency of the oscillation signal are halved. Accordingly, the update rate of the oscillation signal generator may be halved.

Figure 3A:
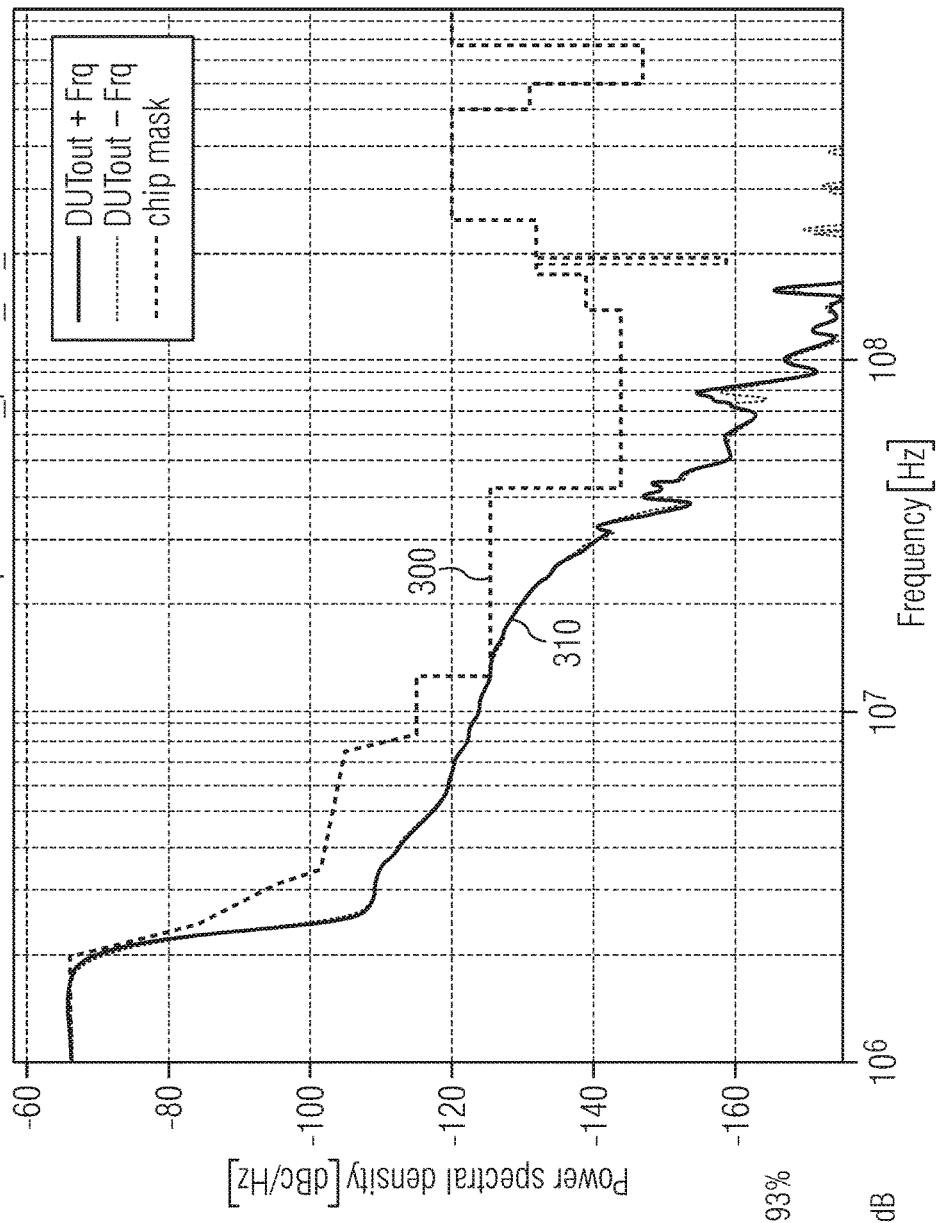
FIGS. 3a to 3c show frequency spectra of the analog RF transmit signal for different first and second sample frequencies.
Figure 3B:
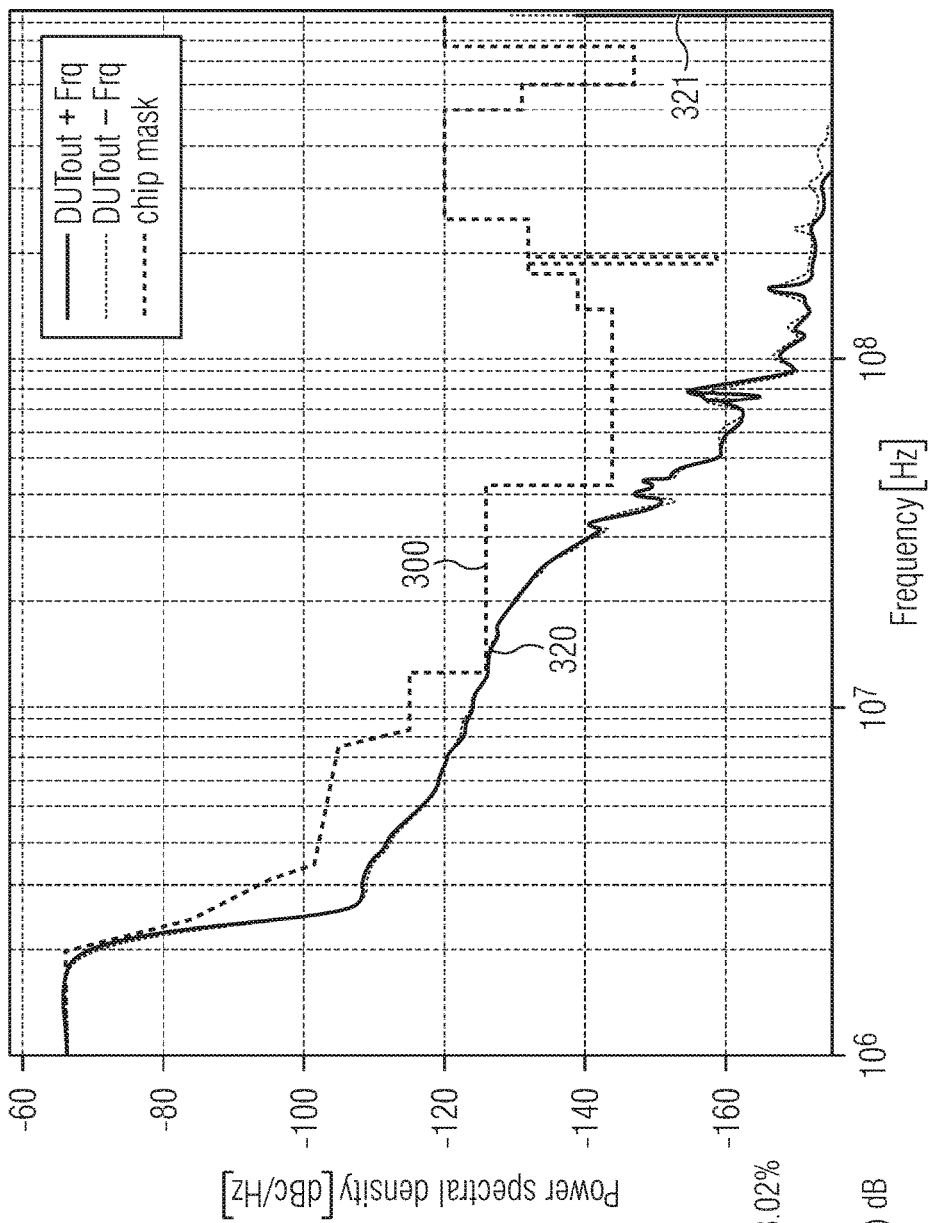
Figure 3C:
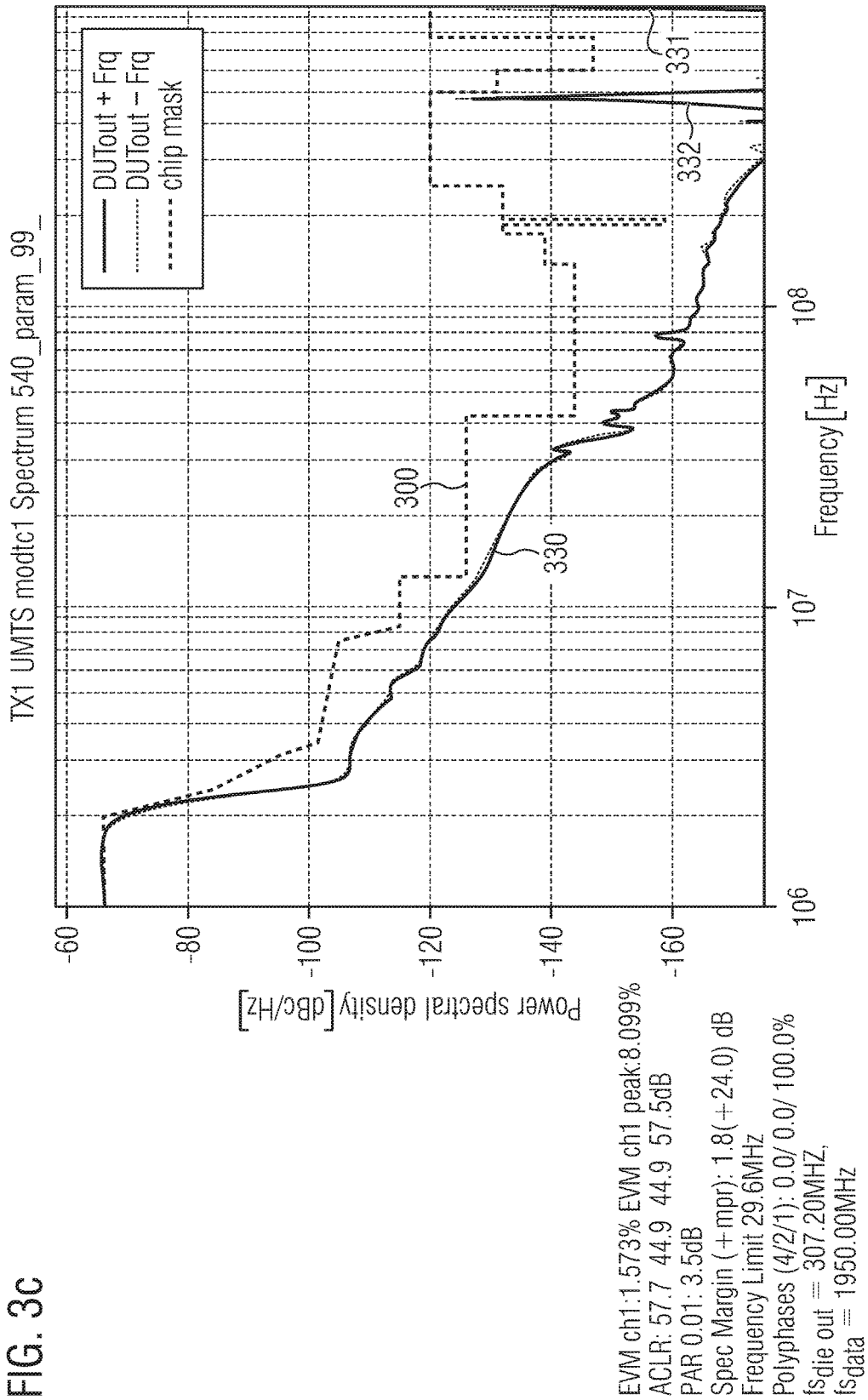

The lower the update rate of the DAC and the oscillation signal generator, the lower the current consumption. However, a drawback of the lower update rate is shown in FIGS. 3a to 3c. FIGS. 3a to 3c show frequency spectra of the analog RF transmit signal for different first and second sample frequencies.

In FIG. 3a, the frequency spectrum of the analog RF transmit signal 310 is illustrated for a transmitter operated in polar mode. The abscissa denotes a frequency range from 1 MHz to 1 GHz. The ordinate denotes the power spectral density in dBc/Hz. As a reference, a spectral mask 300 is illustrated. The analog RF transmit signal 310 needs to comply with the spectral mask 300.

For generating the analog RF transmit signal 310, the DAC and the oscillation signal generator are updated for each RF cycle, i.e., the first sample frequency of the first digital data signal and the second sample frequency of the second digital data signal are equal to the oscillation frequency of the oscillation signal supplied to the DAC. In the example illustrated in FIG. 3a, the first sample frequency of the first digital data signal is 1950 MHz.

It is evident from FIG. 3a, that no alias components are present in the illustrated frequency range.

In FIG. 3b, the frequency spectrum is illustrated for the same transmitter. However, the DAC and the oscillation signal generator are updated for every second RF cycle. That is, the first sample frequency of the first digital data signal and the second sample frequency of the second digital data signal are half of the oscillation frequency of the oscillation signal supplied to the DAC. The resulting analog RF transmit signal 320 is illustrated. Further, the spectral mask 300 is again illustrated.

It is evident from FIG. 3b, that an alias component 321 is present around approx. 975 MHz, i.e., at half of the oscillation frequency.

In FIG. 3c, the frequency spectrum is again illustrated for the same transmitter. However, the DAC and the oscillation signal generator are updated for every fourth RF cycle. That is, the first sample frequency of the first digital data signal and the second sample frequency of the second digital data signal are quarter of the oscillation frequency of the oscillation signal supplied to the DAC. The resulting analog RF transmit signal 330 is illustrated. Further, the spectral mask 300 is again illustrated.

It is evident from FIG. 3b, that an alias component 331 is present around approx. 975 MHz, i.e., at half of the oscillation frequency, and that another alias component 332 is present around approx. 487.5 MHz, i.e., at quarter of the oscillation frequency.

As can be seen from FIGS. 3a to 3c, reducing the update rate of the DAC and the oscillation signal generator may cause alias components in the frequency spectrum of the analog RF transmit signal. These alias components are also present in an RF output signal derived from the analog RF transmit signal. In some cases this may be tolerable in some cases not. In the examples illustrated in FIGS. 3a to 3c, the alias components are tolerable since they are still within power ranges which comply with the spectral mask 300.

However, in case these alias components are not tolerable, the update rate for the DAC and/or the oscillation signal generator needs to be changed. Hence, glitch free switching between different update rates is required. This may be enabled by the exemplary transmitter 400 illustrated in FIG. 4.

Again, the transmitter 400 comprises a DAC 410 configured to receive an oscillation signal 401 and a first digital data signal 402 to generate an analog RF transmit signal 403. An oscillation signal generator 420 is configured to generate the oscillation signal 401 with an oscillation frequency based on a second digital data signal 404. A controller 430 is configured to change a first sample frequency of the first digital data signal 402 from a first frequency to a value lower than the oscillation frequency, wherein the first frequency is at least the oscillation frequency.

The transmitter 400 further comprises a first upsampler 440 configured to generate the first digital data signal 402 by upsampling a third digital data signal 405 with a third sample frequency. The upsampling by the first upsampler 440 is based on a first control signal 406, wherein the controller 430 is configured to supply the first control signal 406 to the first upsampler 440. The first control signal 406 may be based on the desired characteristic of a RF output signal which is derived from the analog RF transmit signal 403. Therefore, the controller 430 may receive according information 431 (e.g. from a baseband processing element). For example, the controller 430 receive information/input

431 of the modem circumstances, e.g., used frequency bands, signal power of the RF output signal (output power), number of resource blocks allocated to the RF output signal, networking signaling values etc.

Figure 4:
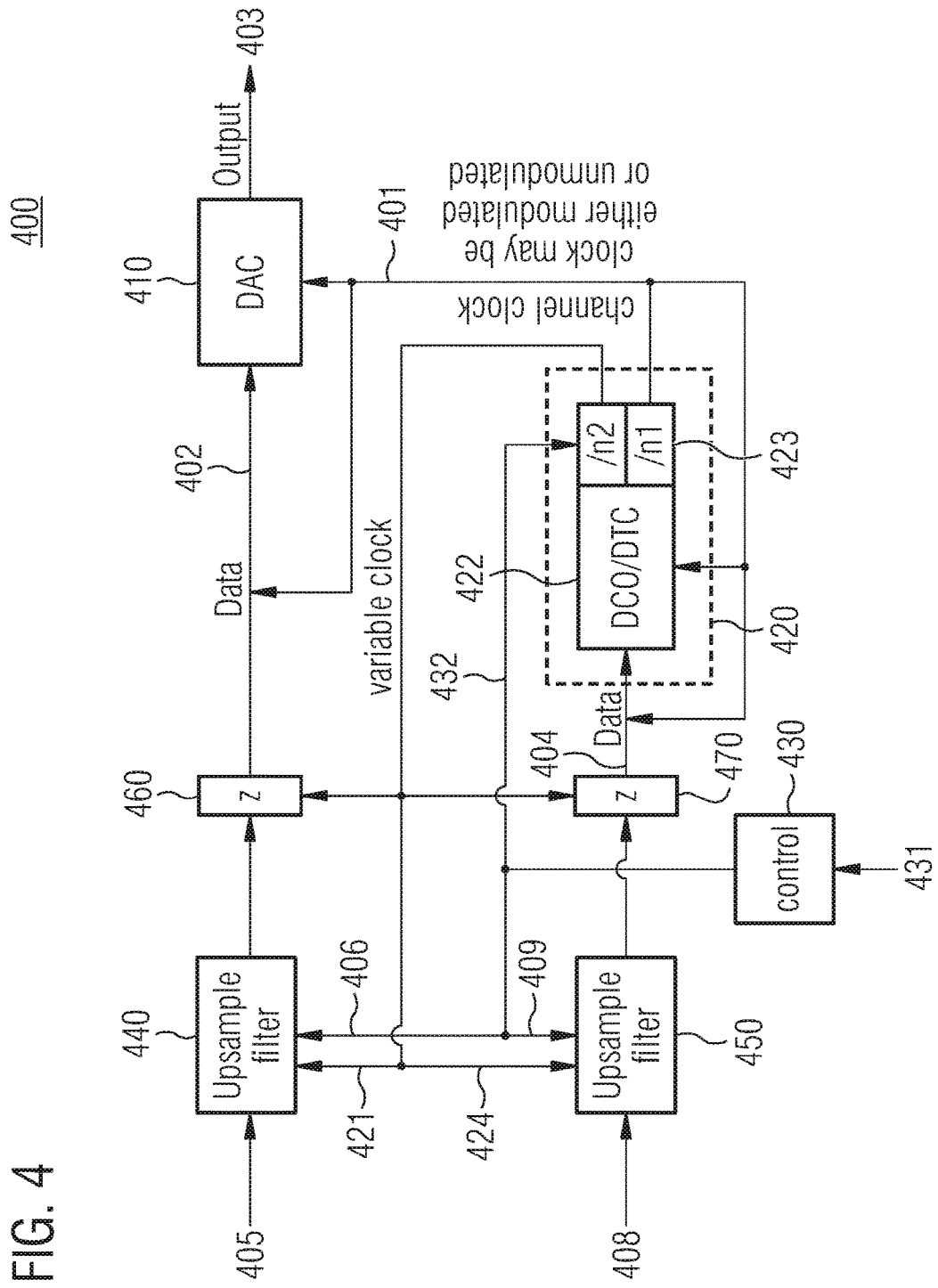
FIG. 4 illustrates another example of a transmitter for generating an analog RF transmit signal.

As indicated in FIG. 4, the first upsampler 440 may e.g., be implemented by an upsampling filter.

The first upsampler 440 is further configured to generate the first digital data signal 402 synchronously with a first auxiliary oscillation signal 421 which is generated by the oscillation signal generator 420. The controller 430 is configured to control the oscillation signal generator 420 to change the frequency of the first auxiliary oscillation signal 421 from the first frequency to a frequency corresponding to the first sample frequency.

The oscillation signal generator 420 illustrated in FIG. 4 comprises one of a Digitally Controlled Oscillator (DCO) and a Digital-to-Time Converter (DTC) 422 configured to provide a local oscillator signal based on the second digital data signal 404. Further, the oscillation signal generator 420 comprises a frequency divider 423 configured to generate the first auxiliary oscillation signal 421 based on the local oscillator signal and a second control signal 432 generated by the controller 430. As indicated in FIG. 4, the second control signal 432 may be based on the desired characteristic of the RF output signal. For example, the frequency divider 423 may divide the local oscillator signal by an integer value n2 for generating the first auxiliary oscillation signal 421. The integer value n2 may, e.g., be selected based on the second control signal 432.

Similarly, the frequency divider 423 may divide the local oscillator signal by an integer value n1 for generating the oscillation signal 401. If rising and falling edges of the oscillation signal 401 are used, also half-integer (i.e. *0.5) divider ratios may be achieved. Further, the oscillation signal 401 may be fed back to the DCO or DTC 422.

The transmitter 400 also comprises a second upsampler 450 configured to generate the second digital data signal 404 by upsampling a fourth digital data signal 408 with a fourth sample frequency. The upsampling by the second upsampler 450 is based on a third control signal 409, wherein the controller 430 is configured to supply the third control signal 409 to the second upsampler 450. Also the third control signal 409 may be based on the desired characteristic of the RF output signal.

The second upsampler 450 is further configured to generate the second digital data signal 404 synchronously with a second auxiliary oscillation signal 424 which is generated by the oscillation signal generator 420, wherein the controller 430 is configured to control the oscillation signal generator 420 to change the frequency of the second auxiliary oscillation signal 424 from the second frequency to a frequency corresponding to the second sample frequency.

In the example illustrated in FIG. 4, the first auxiliary oscillation signal 421 and the second auxiliary oscillation signal 424 are equal, so that the first sample frequency is equal to the second sample frequency. Adjustment of the first auxiliary oscillation signal 421 and the second auxiliary oscillation signal 424 is done by the divider 423.

If n2 is equal to n1, an input cycle is calculated for each RF cycle in polar or Cartesian mode operation of the transmitter 400. That is, the first sample frequency of the first digital data signal 402 and the second sample frequency of the second digital data signal 404 are equal to the oscillation frequency of the oscillation signal 401.

If n2 is larger than n1, less update sample for the DAC 410 and the DCO or DTC 422 are calculated by the first upsampling filter 440 and the second upsampling filter 450. That is, the first sample frequency of the first digital data signal 402 and the second sample frequency of the second digital data signal 404 are lower than the oscillation frequency of the oscillation signal 401.

As indicated above, the controller 430 may determine proper values for the divider ratio n2 and the corresponding interpolation ratio of the upsamplers 440, 450 based on the information 431.

Since the divider ratios n1 and n2 may be set independently from each other, the channel frequency of the analog RF transmit signal 403 and the update rates for the DAC 410 and the DCO or DTC 422 may be decoupled from each other.

However, it is important that the divider 423 starts synchronously, i.e., that after switching up and down the frequency (i.e. the sample frequency) always the same timing phase is set.

Hence, the transmitter 400 further comprises a first register 460 coupled between the first upsampler 440 and the DAC 410. The first register 460 is updated based on the first auxiliary oscillation signal 421. That is, the update rate for the first register 450 is based on the first auxiliary oscillation signal 421. Further, the transmitter 400 comprises a second register 470 coupled between the second upsampler 450 and the oscillation signal generator 420. The second register 470 is updated based on the second auxiliary oscillation signal 424. That is, the update rate for the second register 470 is based on the second auxiliary oscillation signal 424.

The DAC 410 and the DCO or DTC 422 update themselves with the actual register values from the first or second register 460, 470. However, the first and second registers are re-written based on the frequencies of the first auxiliary oscillation signal 421 and the second auxiliary oscillation signal 424, respectively. Hence, if these frequencies are lower than the oscillation frequency of the oscillation signal 401, the registers are re-written with a lower frequency via the digital circuitry (here the upsampling filters 440, 450). In other words, the interpolation ratios of the upsampling filters 440, 450 determine the update rates of the registers 460, 470. That is, one register value may be used for more than one oscillation period of the oscillation signal 401.

The digitally generated update values for the DAC 410 and the DCO or DTC 422 may in some examples be noise shaped, i.e., their digital word length may be greater than a word length of the DAC 410 and the DCO or DTC 422.

In order to enable glitchfree adjustment of the first sample frequency and the second sample frequency, a group delay of the first upsampler 440 may be constant for different values of the first sample frequency, and a group delay of the second upsampler 450 may be constant for different values of the second sample frequency. Therefore, the first upsampler 440 and/or the second upsampler 450 may comprise an upsampling filter as illustrated in FIG. 4, wherein the upsampling filter comprises a plurality of parallel filter paths. That is, the upsampling filter is implemented as polyphase filter. In this respect, the upsampling filter of the first upsampler 440 is configured to begin filtering the third digital data signal 405 with the same filter path for different values of the first sample frequency. Similarly, the upsampling filter of the second upsampler 450 is configured to begin filtering the fourth digital data signal 408 with the same filter path for different values of the second sample frequency.

The upsampling filters may, e.g., comprise respective First In—First Out (FIFO) memories, wherein the controller 430 is configured to control a fill level of the FIFO memories. By controlling the fill level of the FIFO memories, an adjustable delay between the first digital data signal at the first sample frequency and the third digital data signal at the third sample frequency, or the second digital data signal at the second sample frequency and the fourth digital data signal at the fourth sample frequency may be achieved. Hence, different signal run-times in the upsampling filters may be compensated by varying the fill level of the FIFO memories. Further details on implementing a variable delay by controlling the fill level of a FIFO memory are described in pending German Patent Application No. 102015110275.7, filed on Jun. 25, 2015, entitled "Apparatuses and methods for shifting a digital signal by a shift time to provide a shifted signal".

The FIFO memories may allow to avoid variations of the group delay of the upsamplers for different interpolation ratios. Accordingly, glitchfree switching of the first sample frequency and the second sample frequency may be enabled.

The transmitter 400 may also be operated in DDS mode. In this mode, the generation of the RF waveform may as well be done with less samples. Therefore the upsamplers 440, 450 may generate less or more samples.

The transmitter 400 may, hence, allow to vary the update rates of the DAC 410 and the DCO or DTC 422 dynamically according to the needed accuracy. Seamless switching between different rates is featured without any glitches in the analog RF transmit signal 403.

Figure 5:
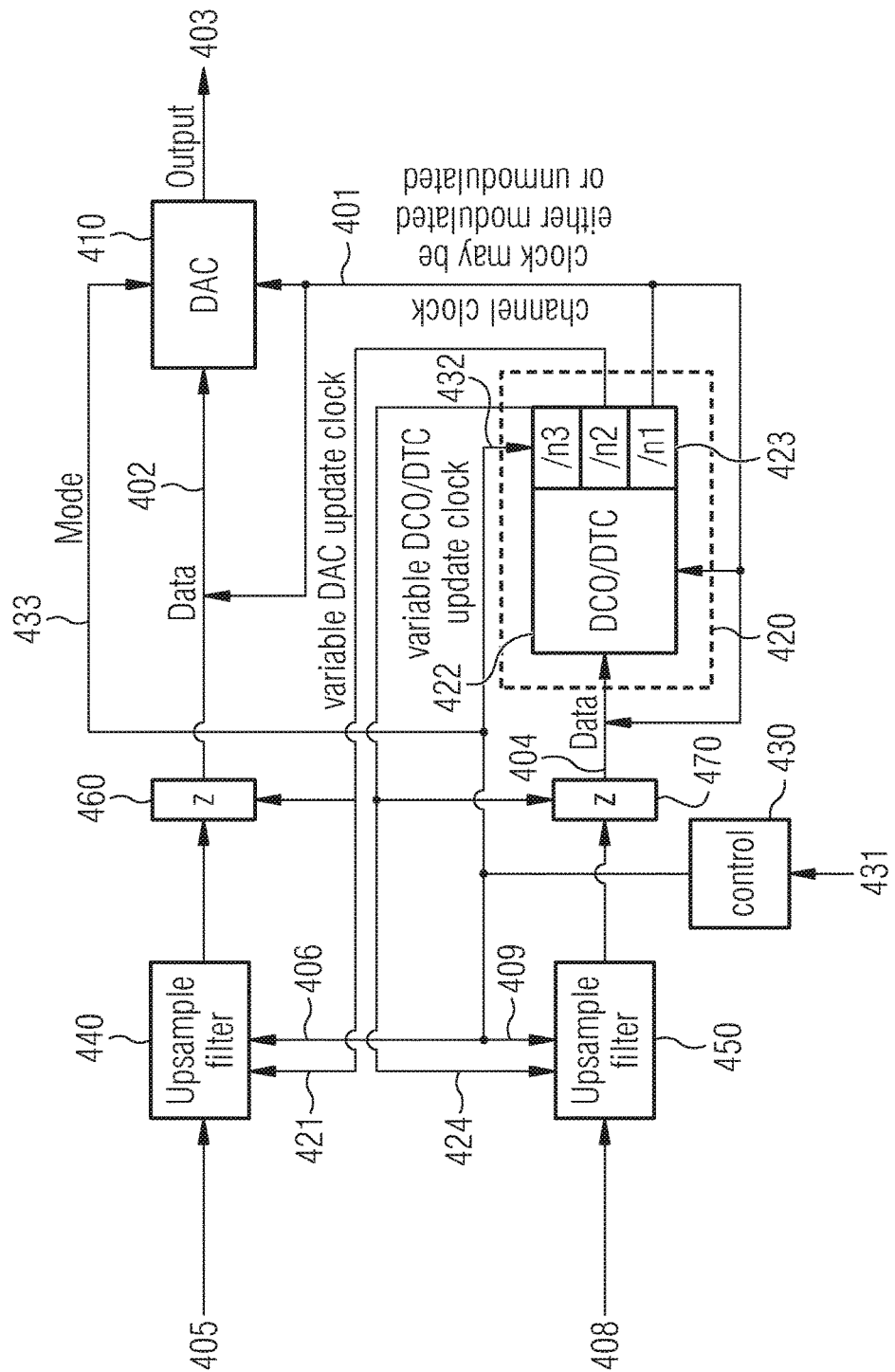
FIG. 5 illustrates still another example of a transmitter for generating an analog RF transmit signal.

In the transmitter 400, the update rates of the DAC 410 and the DCO or DTC 422 are set to be equal. An alternative transmitter 500 with different update frequency values for the DAC 410 and the DCO or DTC 422 is illustrated in FIG. 5.

The transmitter 500 is similar to the transmitter 400 illustrated in FIG. 4. However, the oscillation signal generator 420 is configured to provide the first auxiliary oscillation signal 421 and the second auxiliary oscillation signal 424 with different oscillation frequencies. Accordingly, the first sample frequency of the first digital data signal 402 is different from the second sample frequency of the second digital data signal 404.

For this purpose, the frequency divider 423 divides the local oscillator signal of the DCO or DTC 422 by the value n2 for generating the first auxiliary oscillation signal 421. The value n2 is selected based on the second control signal 432. Further, the frequency divider 423 divides the local oscillator signal of the DCO or DTC 422 by the different value n3 for generating the second auxiliary oscillation signal 424. The value n3 is again selected based on the second control signal 432.

Similarly, the first control signal 406 and the third control signal 409 for the upsamplers 440 and 450 may indicate different interpolation ratios in accordance with the first auxiliary oscillation signal 421 and the second auxiliary oscillation signal 424, respectively.

Hence, a first update rate for the DAC 410 and a second update rate for the oscillation signal generator 420 (here the DCO or DTC 422) may be adjusted.

This may be beneficial when the transmitter is operated in Cartesian or DDS mode since in these modes the channel frequency changes much seldom, so that the update rate for the oscillation signal generator 420 can be at lower rate compared to the update rate of the DAC 410. This may allow to further reduce the current consumption of the transmitter 500.

As indicated in FIG. 5, the controller 430 may additionally adjust (vary) an operation mode of the DAC 410. For example, the controller 430 may adjust if data are transmitted either in polar mode, Cartesian mode or DDS mode. Accordingly, the controller 430 may select a most suitable operation mode for the transmitter 500.

Figure 6:
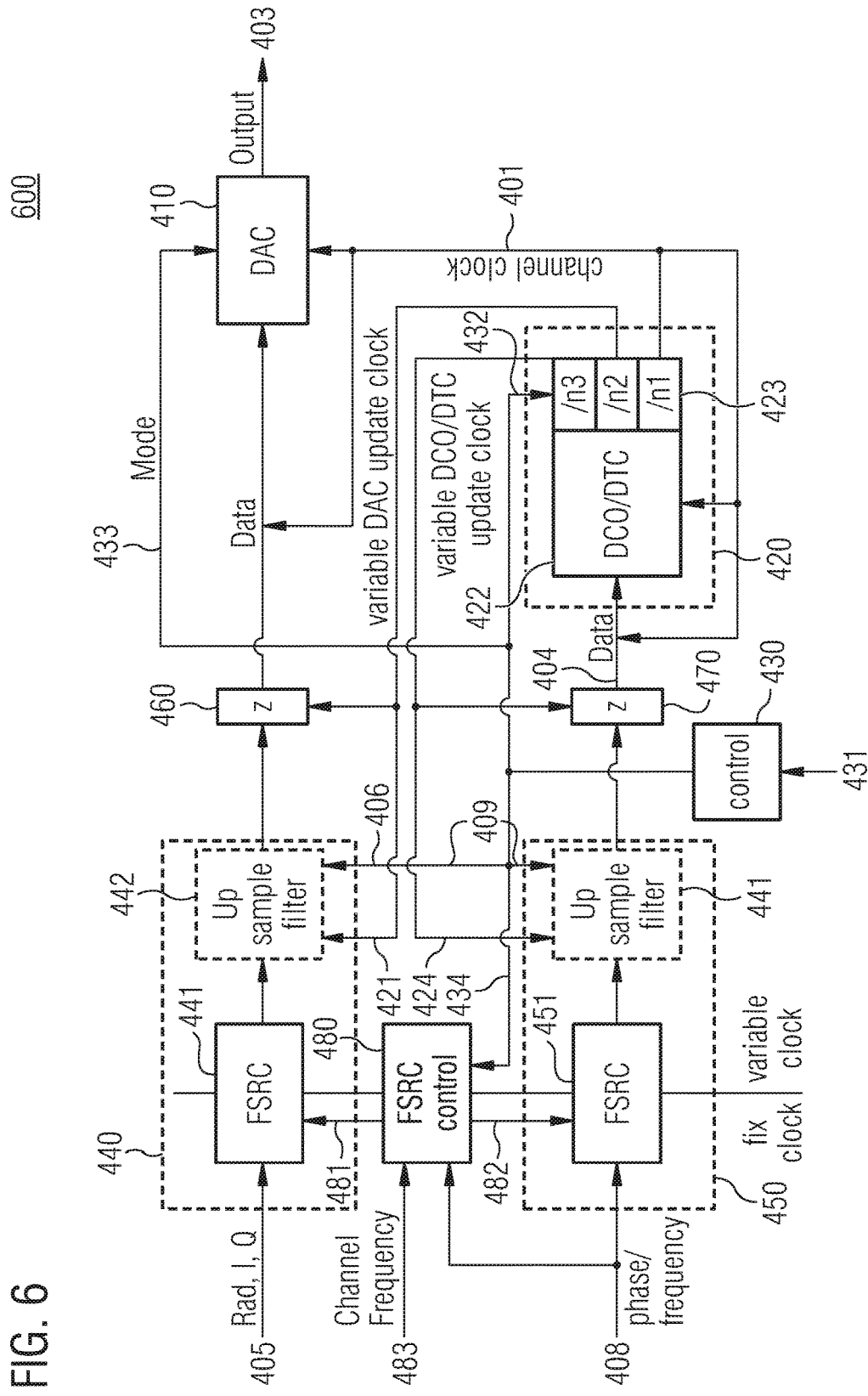
FIG. 6 illustrates a further example of a transmitter for generating an analog RF transmit signal.

An alternative implementation of the upsamplers 440 and 450 is illustrated in FIG. 6. FIG. 6 illustrates a transmitter 600 which is similar to transmitter 500 illustrated in FIG. 5. However, in FIG. 6, the upsamplers 440 and 450 comprise a sample rate converter and optionally an upsampling filter.

The first upsampler 440 comprises a first sample rate converter 441 for upsampling the third digital data signal 405. Similarly, the second upsampler 450 comprises a second sample rate converter 451 for upsampling the fourth digital data signal 408. As indicated in FIG. 6, the sample rate converters 441 and 451 may, e.g., be implemented as Fractional Sample Rate Converters (FSRCs). The interpolation ratios of the sample rate converters 441 and 451 are controlled by a sample rate controller 480. Therefore, the sample rate controller 480 may receive information 483 on a desired channel frequency of the analog RF transmit signal 403 and a fourth control signal 434. The fourth control signal 434 is supplied to the sample rate controller 480 by the controller 430. For example, the fourth control signal 434 may be based on a desired characteristic of a RF output signal derived from the analog RF transmit signal 403. Therefore, the controller 430 may again use the information 431 to generate the fourth control signal 434. Based on the fourth control signal 434 and the information 483 on the desired channel frequency of the analog RF transmit signal 403, the sample rate controller 480 supplies a first sample rate control signal 481 to the first sample rate converter 441 and a second sample rate control signal 482 to the second sample rate converter 451. Based on these control signals, the sample rate converters 441 and 451 (e.g. implemented as FSRCs) deliver the varying interpolation ratio needed for the different updating frequencies of the DAC 410 and the DCO or DTC 422.

Again group delays of the sample rate converters 441 and 451 may be constant for different values of the first or the second sample frequency. Therefore, the sample rate converters 441 and 451 may, e.g., comprise FIFO memories which are fill level controlled similar to the upsampling filters discussed in connection with FIG. 4. Additionally or alternatively, an adjustment of the varying group delays of the sample rate converters 441 and 451 for different interpolation ratios may be done within Numerically Controlled Oscillators (NCOs) of the sample rate converters 441 and 451, or with preceding all pass filters upstream of the sample rate converters 441 and 451.

Optionally, the first upsampler 440 may comprise a first upsampling filter 442 to further interpolate the output of the first sample rate converter 441. Similarly, the second upsampler 450 may optionally comprise a second upsampling filter 452 to further interpolate the output of the second sample rate converter 451.

That is, in the transmitter 600 of FIG. 6 sample rate converters (e.g. FSRCs) are added. The sample rate converters calculate the data coming from the fixed clock domain (e.g. at a clock derived from a quartz frequency of 38.4 MHz) to the data rate needed for the variable clock domain (clock derived from channel frequency in, e.g., GHz range). The variable clock may, e.g., be data dependent in polar mode or channel frequency dependent in Cartesian mode. As discussed above, the constant group delay may be achieved by using an upsampling filter, a sample rate converter with adjustable NCO for subsample delay and registers for integer delay, or an all pass filter in front of the sample rate converter.

Therefore, also transmitter 600 may allow to vary the update rates of the DAC 410 and the DCO or DTC 422 dynamically according to the needed accuracy. Seamless switching between different rates is featured without any glitches in the analog RF transmit signal 403.

Figure 7:
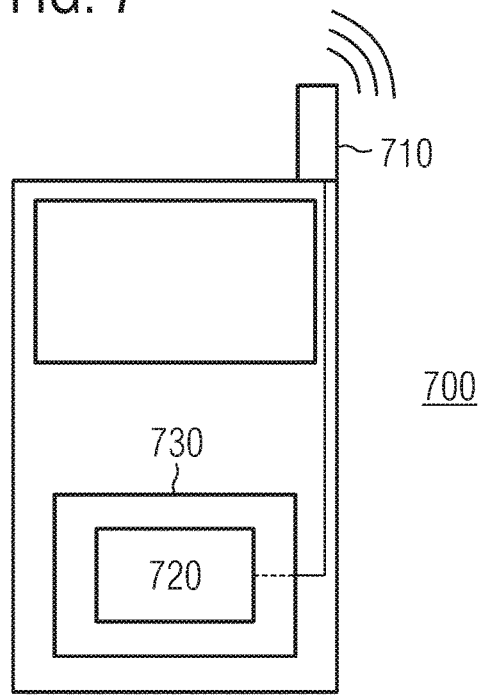
FIG. 7 illustrates an example of a mobile communications device comprising a transmitter for generating an analog RF transmit signal.

An example of an implementation using a transmitter for generating an analog RF transmit signal according to one or more aspects of the proposed concept or one or more examples described above is illustrated in FIG. 7. FIG. 7 schematically illustrates an example of a mobile communications device or mobile phone or user equipment 700 comprising a transmitter 720 according to an example described herein. The transmitter 720 may be comprised by a transceiver 730. An antenna element 710 of the mobile communications device 700 may be coupled to the transmitter 720, or the transceiver 730. To this end, mobile communications devices may be provided allowing reduced current consumption.

Figure 8:
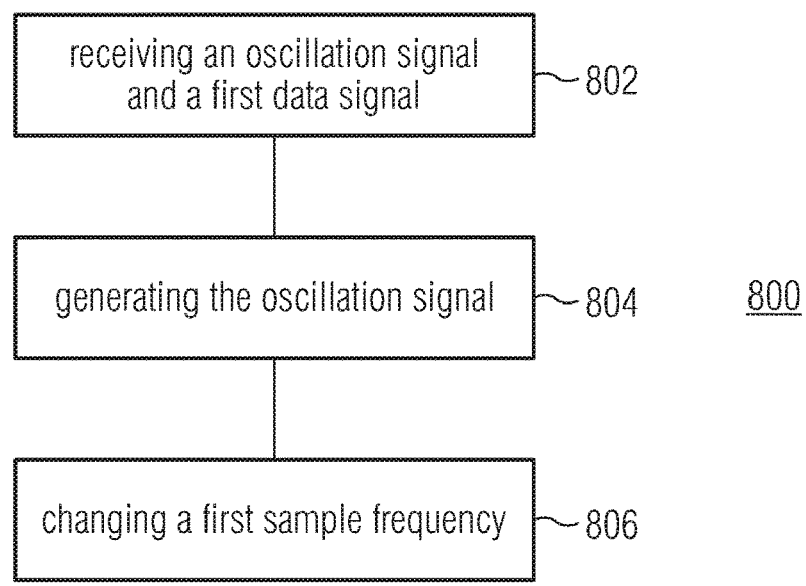
FIG. 8 illustrates a flowchart of an example of a method for generating an analog RF transmit signal.

An example of a method 800 for generating an analog RF transmit signal is illustrated by means of a flowchart in FIG. 8. The method 800 comprises receiving 802 an oscillation signal and a first digital data signal by a digital-to-analog converter to generate an analog RF transmit signal. Moreover, the method 800 comprises generating 804 the oscillation signal with an oscillation frequency based on a second digital data signal. The method 800 further comprises changing 806 a first sample frequency of the first digital data signal from a first frequency to a value different than the oscillation frequency. The first frequency is at least the oscillation frequency.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

The examples as described herein may be summarized as follows:

Example 1 is a transmitter for generating an analog radio frequency transmit signal, comprising: a digital-to-analog converter configured to receive an oscillation signal and a first digital data signal to generate the analog radio frequency transmit signal; an oscillation signal generator configured to generate the oscillation signal with an oscillation frequency based on a second digital data signal; and a controller configured to change a first sample frequency of the first digital data signal from a first frequency to a value different than the oscillation frequency, wherein the first frequency is at least the oscillation frequency.

In example 2, the controller of the transmitter of example 1 is configured to change the first sample frequency from the first frequency to a value lower than the oscillation frequency.

In example 3, the controller of the transmitter of example 1 or example 2 is configured to change the first sample frequency based on a desired characteristic of a radio frequency output signal which is derived from the analog radio frequency transmit signal.

In example 4, the desired characteristic of the radio frequency output signal in the transmitter of example 3 is one of a carrier frequency of the radio frequency output signal, a signal power of the radio frequency output signal, a bandwidth of the radio frequency output signal, a number of resource blocks allocated to the radio frequency output signal, a number of frequency carriers of the radio frequency output signal, a duplex distance between the radio frequency output signal and a radio frequency receive signal, or a frequency and/or amplitude of an alias component in the radio frequency output signal.

In example 5, a value of the desired characteristic of the radio frequency output signal in the transmitter of example 4 depends on a characteristic of an external component processing the analog radio frequency transmit signal or a signal related to the analog radio frequency transmit signal.

In example 6, the transmitter of any of examples 1 to 5 further comprises a first upsampler configured to generate the first digital data signal by upsampling a third digital data signal with a third sample frequency based on a first control signal, wherein the controller is configured to supply the first control signal to the first upsampler.

In example 7, the first control signal in the transmitter of example 6 is based on the desired characteristic of the radio frequency output signal.

In example 8, the first upsampler of the transmitter of example 6 or example 7 is further configured to generate the first digital data signal synchronously with a first auxiliary oscillation signal which is generated by the oscillation signal generator, wherein the controller is configured to control the oscillation signal generator to change the frequency of the first auxiliary oscillation signal from the first frequency to a frequency corresponding to the first sample frequency.

In example 9, the oscillation signal generator of the transmitter of example 8 comprises: one of a digitally controlled oscillator and a digital-to-time converter configured to provide a local oscillator signal based on the second digital data signal; and a frequency divider configured to generate the first auxiliary oscillation signal based on the local oscillator signal and a second control signal generated by the controller.

In example 10, the second control signal in the transmitter of example 9 is based on the desired characteristic of the radio frequency output signal.

In example 11, the transmitter of any of examples 8 to 10 further comprises a first register coupled between the first upsampler and the digital-to-analog converter, wherein the first register is updated based on the first auxiliary oscillation signal.

In example 12, a group delay of the first upsampler of the transmitter of any of examples 6 to 11 is constant for different values of the first sample frequency.

In example 13, the first upsampler of the transmitter of any of examples 6 to 12 comprises an upsampling filter and/or a sample rate converter.

In example 14, the upsampling filter of the transmitter of example 13 comprises a plurality of parallel filter paths, wherein the upsampling filter is configured to begin filtering the third digital data signal with the same filter path for different values of the first sample frequency.

In example 15, the upsampling filter and/or the sample rate converter of the transmitter of example 13 or example 14 comprises a First In—First Out memory, wherein the controller configured to control a fill level of the First In—First Out memory.

In example 16, the oscillation frequency in the transmitter of any of the preceding examples is equal to the first frequency.

In example 17, the controller of the transmitter of any of the preceding examples is further configured to change a second sample frequency of the second digital data signal from a second frequency to a value lower than the second frequency.

In example 18, the controller of the transmitter of example 17 is configured to change the second sample frequency based on the desired characteristic of the radio frequency output signal.

In example 19, the transmitter of example 17 or example 18 further comprises a second upsampler configured to generate the second digital data signal by upsampling a fourth digital data signal with a fourth sample frequency based on a third control signal, wherein the controller is configured to supply the third control signal to the second upsampler.

In example 20, the third control signal in the transmitter of example 19 is based on the desired characteristic of the radio frequency output signal.

In example 21, the second upsampler of the transmitter of example 19 or example 20 is further configured to generate the second digital data signal synchronously with a second auxiliary oscillation signal which is generated by the oscillation signal generator, wherein the controller is configured to control the oscillation signal generator to change the frequency of the second auxiliary oscillation signal from the second frequency to a frequency corresponding to the second sample frequency.

In example 22, the transmitter of example 21 further comprises a second register coupled between the second upsampler and the oscillation signal generator, wherein the second register is updated based on the second auxiliary oscillation signal.

In example 23, a group delay of the second upsampler of the transmitter of any of examples 19 to 22 is constant for different values of the second sample frequency.

In example 24, the value lower than the second frequency in the transmitter of any of examples 17 to 23 is equal to the value different than the oscillation frequency.

In example 25, the value different than the oscillation frequency in the transmitter of any of examples 17 to 23 is greater than the value lower than the second frequency.

Example 26 is transceiver comprising a transmitter according to any of examples 1 to 25.

Example 27 is a mobile communications device comprising a transmitter according to any of examples 1 to 25, or a transceiver according to example 26.

In example 28, the mobile communications device of example 27 further comprises at least one antenna coupled to the transmitter or the transceiver.

Example 29 is A means for generating an analog radio frequency transmit signal, comprising: a means for receiving an oscillation signal and a first digital data signal to generate the analog radio frequency transmit signal; a means for generating the oscillation signal with an oscillation frequency based on a second digital data signal; and a means for changing a first sample frequency of the first digital data signal from a first frequency to a value different than the oscillation frequency, wherein the first frequency is at least the oscillation frequency.

In example 30, the means for changing the first sample frequency of the means of example 29 is configured to change the first sample frequency from the first frequency to a value lower than the oscillation frequency.

In example 31, the means for changing the first sample frequency of the means of example 29 or example 30 is configured to change the first sample frequency based on a desired characteristic of a radio frequency output signal which is derived from the analog radio frequency transmit signal.

Example 32 is a method for generating an analog radio frequency transmit signal, comprising: receiving an oscillation signal and a first digital data signal by a digital-to-analog converter to generate the analog radio frequency transmit signal; generating the oscillation signal with an oscillation frequency based on a second digital data signal; and changing a first sample frequency of the first digital data signal from a first frequency to a value different than the oscillation frequency, wherein the first frequency is at least the oscillation frequency.

In example 33, changing the first sample frequency of the first digital data signal from the first frequency to the value different than the oscillation frequency in the method of example 32 comprises changing the first sample frequency from the first frequency to a value lower than the oscillation frequency.

In example 34, changing the first sample frequency in the method of example 32 or example 33 is based on a desired characteristic of a radio frequency output signal which is derived from the analog radio frequency transmit signal.

In example 35, the desired characteristic of the radio frequency output signal in the method of example 34 is one of a carrier frequency of the radio frequency output signal, a signal power of the radio frequency output signal, a bandwidth of the radio frequency output signal, a number of resource blocks allocated to the radio frequency output signal, a number of frequency carriers of the radio frequency output signal, a duplex distance between the radio frequency output signal and a radio frequency receive signal, or a frequency and/or amplitude of an alias component in the radio frequency output signal.

In example 36, a value of the desired characteristic of the radio frequency output signal in the method of example 35 depends on a characteristic of an external component processing the analog radio frequency transmit signal or a signal related to the analog radio frequency transmit signal.

In example 37, the method of any of examples 32 to 36 further comprises generating the first digital data signal by upsampling a third digital data signal with a third sample frequency based on a first control signal.

In example 38, the first control signal in the method of example 37 is based on the desired characteristic of the radio frequency output signal.

In example 39, the first digital data signal in the method of example 37 or example 38 is generated synchronously with a first auxiliary oscillation signal, and the frequency of the first auxiliary oscillation signal is changed from the first frequency to a frequency corresponding to the first sample frequency.

In example 40, the oscillation frequency in the method of any of the preceding examples is equal to the first frequency.

In example 41, the method of any of the preceding examples further comprises changing a second sample frequency of the second digital data signal from a second frequency to a value lower than the second frequency.

In example 42, the second sample frequency in the method of example 41 is changed based on the desired characteristic of a radio frequency output signal.

In example 43, the method of example 41 or example 42 further comprises generating the second digital data signal by upsampling a fourth digital data signal with a fourth sample frequency based on a third control signal.

In example 44, the third control signal in the method of example 43 is based on the desired characteristic of the radio frequency output signal.

In example 45, the second digital data signal in the method of example 43 or example 44 is generated synchronously with a second auxiliary oscillation signal, wherein the frequency of the second auxiliary oscillation signal is changed from the second frequency to a frequency corresponding to the second sample frequency.

In example 46, the value lower than the second frequency in the method of any of examples 41 to 45 is equal to the value different than the oscillation frequency.

In example 47, the value different than the oscillation frequency in the method of any of examples 41 to 45 is greater than the value lower than the second frequency.

Example 48 is a computer readable storage medium having stored thereon a program having a program code for performing the method of any of examples 32 to 47, when the program is executed on a computer or processor.

Example 49 is a computer program having a program code configured to perform the method of any of examples 32 to 47, when the computer program is executed on a computer or processor.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A transmitter for generating an analog radio frequency transmit signal, comprising:
   a digital-to-analog converter configured to receive an oscillation signal and a first digital data signal to generate the analog radio frequency transmit signal;
   an oscillation signal generator configured to generate the oscillation signal with an oscillation frequency based on a second digital data signal; and
   a controller configured to change a first sample frequency of the first digital data signal from a first frequency to a value different than the oscillation frequency, wherein the first frequency is at least the oscillation frequency.

2. The transmitter of claim 1, wherein the controller is configured to change the first sample frequency from the first frequency to a value lower than the oscillation frequency.

3. The transmitter of claim 1, wherein the controller is configured to change the first sample frequency based on a desired characteristic of a radio frequency output signal which is derived from the analog radio frequency transmit signal.

4. The transmitter of claim 3, wherein the desired characteristic of the radio frequency output signal is one of a carrier frequency of the radio frequency output signal, a signal power of the radio frequency output signal, a bandwidth of the radio frequency output signal, a number of resource blocks allocated to the radio frequency output signal, a number of frequency carriers of the radio frequency output signal, a duplex distance between the radio frequency output signal and a radio frequency receive signal, or a frequency and/or amplitude of an alias component in the radio frequency output signal.

5. The transmitter of claim 1, wherein the transmitter further comprises a first upsampler configured to generate the first digital data signal by upsampling a third digital data signal with a third sample frequency based on a first control signal, and wherein the controller is configured to supply the first control signal to the first upsampler.

6. The transmitter of claim 5, wherein the first control signal is based on the desired characteristic of the radio frequency output signal.

7. The transmitter of claim 5, wherein the first upsampler is further configured to generate the first digital data signal synchronously with a first auxiliary oscillation signal which is generated by the oscillation signal generator, and wherein the controller is configured to control the oscillation signal generator to change the frequency of the first auxiliary oscillation signal from the first frequency to a frequency corresponding to the first sample frequency.

8. The transmitter of claim 7, wherein the oscillation signal generator comprises:
one of a digitally controlled oscillator and a digital-to-time converter configured to provide a local oscillator signal based on the second digital data signal; and
a frequency divider configured to generate the first auxiliary oscillation signal based on the local oscillator signal and a second control signal generated by the controller.

9. The transmitter of claim 8, wherein the second control signal is based on the desired characteristic of the radio frequency output signal.

10. The transmitter of claim 7, wherein the transmitter further comprises a first register coupled between the first upsampler and the digital-to-analog converter, wherein the first register is updated based on the first auxiliary oscillation signal.

11. The transmitter of claim 5, wherein a group delay of the first upsampler is constant for different values of the first sample frequency.

12. The transmitter of claim 5, wherein the first upsampler comprises an upsampling filter and/or a sample rate converter.

13. The transmitter of claim 12, wherein the upsampling filter comprises a plurality of parallel filter paths, and wherein the upsampling filter is configured to begin filtering the third digital data signal with the same filter path for different values of the first sample frequency.

14. The transmitter of claim 1, wherein the oscillation frequency is equal to the first frequency.

15. The transmitter of claim 1, wherein the controller is further configured to change a second sample frequency of the second digital data signal from a second frequency to a value lower than the second frequency.

16. The transmitter of claim 15, wherein the transmitter further comprises a second upsampler configured to generate the second digital data signal by upsampling a fourth digital data signal with a fourth sample frequency based on a third control signal, and wherein the controller is configured to supply the third control signal to the second upsampler.

17. The transmitter of claim 16, wherein the second upsampler is further configured to generate the second digital data signal synchronously with a second auxiliary oscillation signal which is generated by the oscillation signal generator, and wherein the controller is configured to control the oscillation signal generator to change the frequency of the second auxiliary oscillation signal from the second frequency to a frequency corresponding to the second sample frequency.

18. The transmitter of claim 17, wherein the transmitter further comprises a second register coupled between the second upsampler and the oscillation signal generator, wherein the second register is updated based on the second auxiliary oscillation signal.

19. The transmitter of claims 16, wherein a group delay of the second upsampler is constant for different values of the second sample frequency.

20. A mobile communications device comprising a transmitter according to claim 1.

21. A method for generating an analog radio frequency transmit signal, comprising:
receiving an oscillation signal and a first digital data signal by a digital-to-analog converter to generate the analog radio frequency transmit signal;
generating the oscillation signal with an oscillation frequency based on a second digital data signal; and
changing a first sample frequency of the first digital data signal from a first frequency to a value different than the oscillation frequency, wherein the first frequency is at least the oscillation frequency.

22. The method of claim 21, wherein changing the first sample frequency of the first digital data signal from the first frequency to the value different than the oscillation frequency comprises changing the first sample frequency from the first frequency to a value lower than the oscillation frequency.

23. The method of claim 21, wherein changing the first sample frequency is based on a desired characteristic of a radio frequency output signal which is derived from the analog radio frequency transmit signal.

24. The method of claim 21, wherein the method further comprises generating the first digital data signal by upsampling a third digital data signal with a third sample frequency based on a first control signal.

25. The method of claim 21, wherein the method further comprises changing a second sample frequency of the second digital data signal from a second frequency to a value lower than the second frequency.

* * * * *